United States Patent
Kim et al.

(10) Patent No.: US 12,283,719 B2
(45) Date of Patent: Apr. 22, 2025

(54) BATTERY MODULE

(71) Applicant: SK On Co., Ltd., Seoul (KR)

(72) Inventors: Yong Uk Kim, Daejeon (KR); Byung Jun Park, Daejeon (KR); Suk Chul Kim, Daejeon (KR); Yun Hee Kim, Daejeon (KR); Jong Ho Seok, Daejeon (KR); Tae Hyun Chang, Daejeon (KR); Dong Hwa Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 481 days.

(21) Appl. No.: 17/724,442

(22) Filed: Apr. 19, 2022

(65) Prior Publication Data

US 2022/0336927 A1 Oct. 20, 2022

(30) Foreign Application Priority Data

Apr. 20, 2021 (KR) .................. 10-2021-0051304

(51) Int. Cl.
*H01M 50/505* (2021.01)
*H01M 10/42* (2006.01)
*H01M 50/204* (2021.01)

(52) U.S. Cl.
CPC ....... *H01M 50/505* (2021.01); *H01M 10/425* (2013.01); *H01M 50/204* (2021.01); *H01M 2010/4271* (2013.01); *H01M 2200/103* (2013.01); *H01M 2220/20* (2013.01)

(58) Field of Classification Search
CPC .. H01M 50/505; H01M 50/204; H01M 10/42; H01M 10/425
See application file for complete search history.

(56) References Cited

U.S. PATENT DOCUMENTS

2019/0131805 A1 5/2019 Rush et al.
2019/0334142 A1* 10/2019 Kwon ................. H01M 50/209

FOREIGN PATENT DOCUMENTS

KR 10-1428254 B1 8/2014
KR 10-2018-0086769 A 8/2018
KR 10-2019-0124482 A 11/2019

OTHER PUBLICATIONS

Extended European Search Report for the European Patent Application No. 22165269.6 issued by the European Patent Office on Sep. 9, 2022.

* cited by examiner

*Primary Examiner* — Karie O'Neill Apicella
(74) *Attorney, Agent, or Firm* — IP & T GROUP LLP

(57) ABSTRACT

A battery module is proposed. The battery module includes a plurality of battery sub-modules, and a front cover part configured to cover an outermost stacking surface of the plurality of stacked battery sub-modules. The front cover part includes a front plate including a contact terminal electrically connected to an outside, a bus bar electrically connecting the plurality of battery sub-modules to each other, and a disconnection induction bus bar coupled to an inside end of the contact terminal to press and contact the bus bar, and a switching slider configured to slide between the bus bar and the disconnection induction bus bar.

9 Claims, 9 Drawing Sheets

BATTERY MODULE

CROSS REFERENCE TO RELATED APPLICATION

The present application claims priority to Korean Patent Application No. 10-2021-0051304, filed Apr. 20, 2021, the entire contents of which are incorporated herein for all purposes by this reference.

BACKGROUND OF THE INVENTION

Field of the Invention

The present invention relates to a battery module.

Description of the Related Art

Secondary batteries may be repeatedly charged and discharged, and may be applied to various fields such as various mobile devices, electric vehicles (EVs), hybrid electric vehicles (HEVs), or energy storage systems (ESS). With the continuous development of technology, a model capable of outputting more compact and stronger power is being developed.

A plurality of secondary batteries is connected in series and/or in parallel to be used in a high-output electric vehicle or hybrid vehicle. The plurality of secondary batteries may be fixed using a member such as a cover or a case, and the plurality of secondary batteries may be electrically connected to each other using a bus bar or the like to be used in the form of a single battery module.

In particular, the energy storage system is a device that stores generated power or surplus power or supplies insufficient power in a system with power stored in the secondary battery. Such an energy storage system typically forms a single battery system by electrically connecting battery racks composed of a plurality of battery modules, and requires more attention to safety because the energy storage system may be exposed to a high voltage of several times to several tens of times, unlike a battery pack installed in an electric vehicle or a hybrid vehicle.

As described above, the energy storage system may have the risk of accidents such as short circuit or earth fault when a high voltage is applied to an external terminal of the battery module. In order to solve this problem, in Patent Document 1 that was previously filed by the applicant of the present invention, it is determined whether the high voltage is applied to the external terminal of the battery module using a Manual Service Device (MSD) module.

DOCUMENTS OF RELATED ART (Patent Document 1) KR 10-2019-0124482

SUMMARY OF THE INVENTION

Accordingly, the present invention has been made keeping in mind the above problems occurring in the related art, and an objective of the present invention is to provide a battery module which can secure stability by determining whether to block or allow the application of voltage to an external terminal in a sliding manner of a switching member.

In order to achieve the objective of the present invention, the present invention provides a battery module, including a plurality of battery sub-modules; and a front cover part configured to cover an outermost stacking surface of the plurality of stacked battery sub-modules, wherein the front cover part may include a front plate including a contact terminal electrically connected to an outside, a bus bar electrically connecting the plurality of battery sub-modules to each other, and a disconnection induction bus bar coupled to an inside end of the contact terminal to press and contact the bus bar; and a switching slider configured to slide between the bus bar and the disconnection induction bus bar.

The disconnection induction bus bar may be elastically supported on the front plate by an elastic member.

The disconnection induction bus bar may be spaced apart from the bus bar.

A contact end of the disconnection induction bus bar may form an internal threaded hole in an internal area, and a contact end of the bus bar may form an internal threaded hole on a same line as the internal threaded hole of the disconnection induction bus bar.

The disconnection induction bus bar and the bus bar may be fastened by a bolt to be pressed and contacted.

The front plate may further arrange a fuse between the contact terminal and the disconnection induction bus bar.

The switching slider may be slidably disposed on the front cover coupled to the front plate.

The front cover may include a first window allowing penetration of the contact terminal; and a second window spaced apart from the first window by a predetermined distance, and the switching slider may be slidably disposed between the first window and the second window.

The second window may be formed at a position corresponding to an overlapping portion between the disconnection induction bus bar and the bus bar.

The switching slider may have a length within a range from a maximum spacing distance between the first window and the second window to a minimum spacing distance between the first window and the second window.

The above and other objectives, features, and other advantages of the present invention will be more clearly understood from the following detailed description when taken in conjunction with the accompanying drawings.

The terms or words used in the specification and claims are not limited to the meanings found in a dictionary, but must be understood as having meanings and concepts which are defined within the scope of the invention, as long as the inventor can appropriately define the concept of terms so as to best explain the invention.

According to the present invention, the application of a voltage to an external terminal can be determined by easily switching the current path of a battery module to an open/close state in a sliding manner.

In particular, according to the present invention, overlapping portions between an elastically-supported disconnection induction bus bar and a bus bar are spaced apart from each other, so that it is possible to induce a change in movement of a switching slider therebetween. If the retraction of the switching slider is limited, the present invention does not allow the exposure of a live part, thereby ensuring the safety of a worker.

In addition, the present invention is advantageous in that the position of a switching slider can be detected with the naked eyes, and the voltage application state of a battery module can be easily checked on the basis of the position of the switching slider.

DETAILED DESCRIPTION OF THE INVENTION

Figure 1:
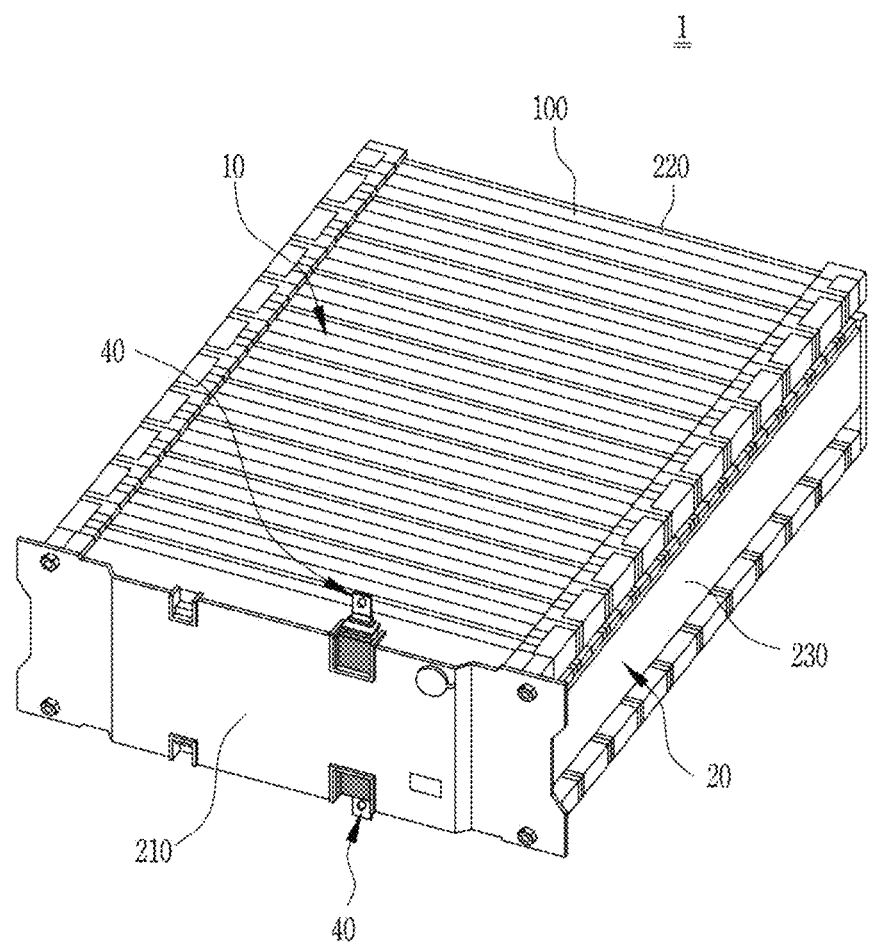
FIG. 1 is a perspective view schematically illustrating a battery module according to an embodiment of the present invention.

The above and other objectives, features, and other advantages of the present invention will be more clearly understood from the following detailed description when taken in conjunction with the accompanying drawings. The same reference numerals are used throughout the drawings to designate the same or similar components. In addition, in describing the present invention, if it is determined that a detailed description of a related known technology may unnecessarily obscure the subject matter of the present invention, the detailed description thereof will be omitted. It will be understood that, although the terms "first", "second", etc. may be used herein to describe various elements, these elements should not be limited by these terms. These terms are only used to distinguish one element from another element. Furthermore, the size or shape of components shown in the drawings may be exaggerated for the clarity and convenience of description.

Hereinafter, the preferred embodiment of the present invention will be described in detail with reference to the accompanying drawings.

Figure 2:
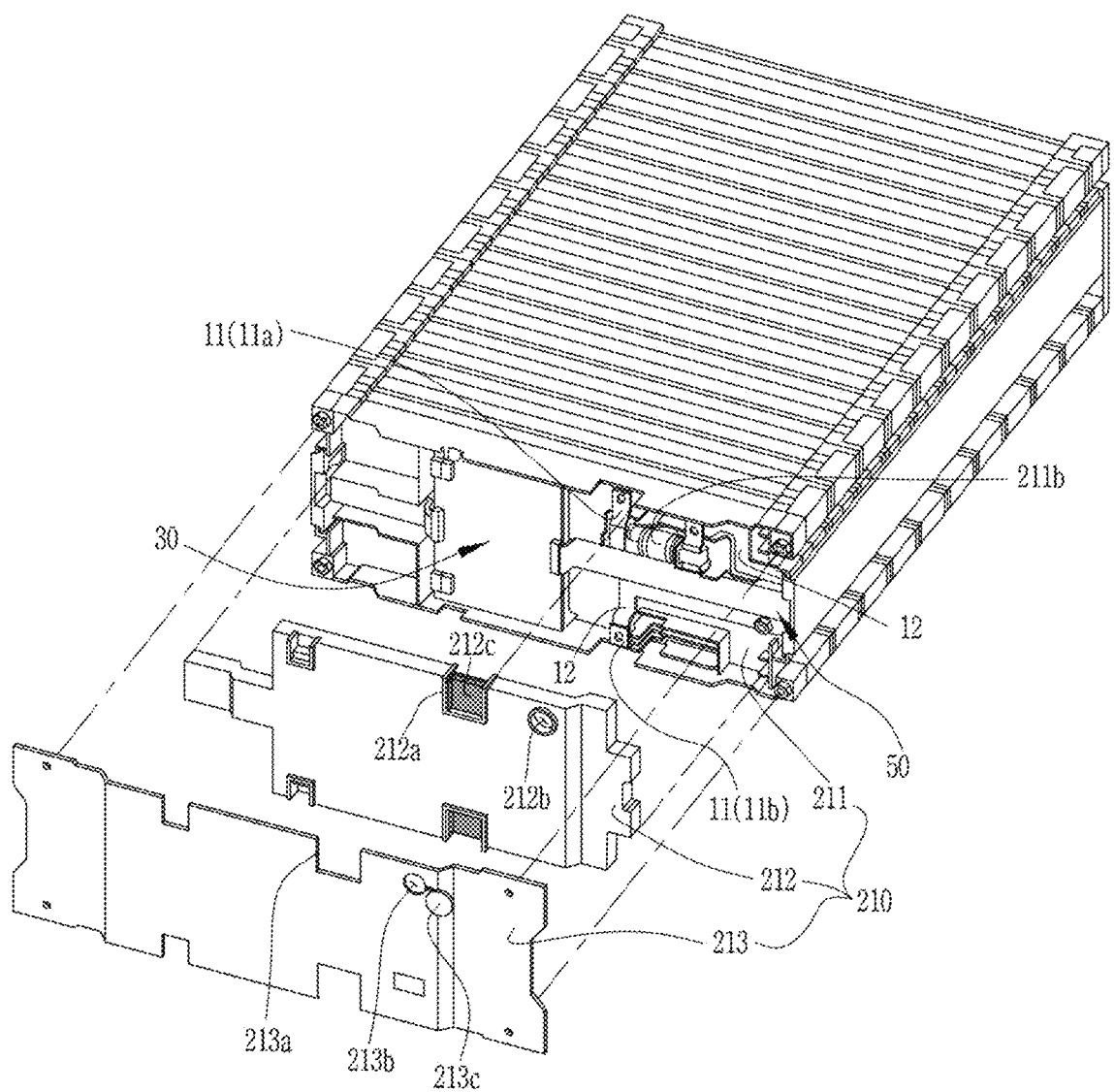
FIG. 2 is a partially exploded perspective view of the battery module shown in FIG. 1.
Figure 3:
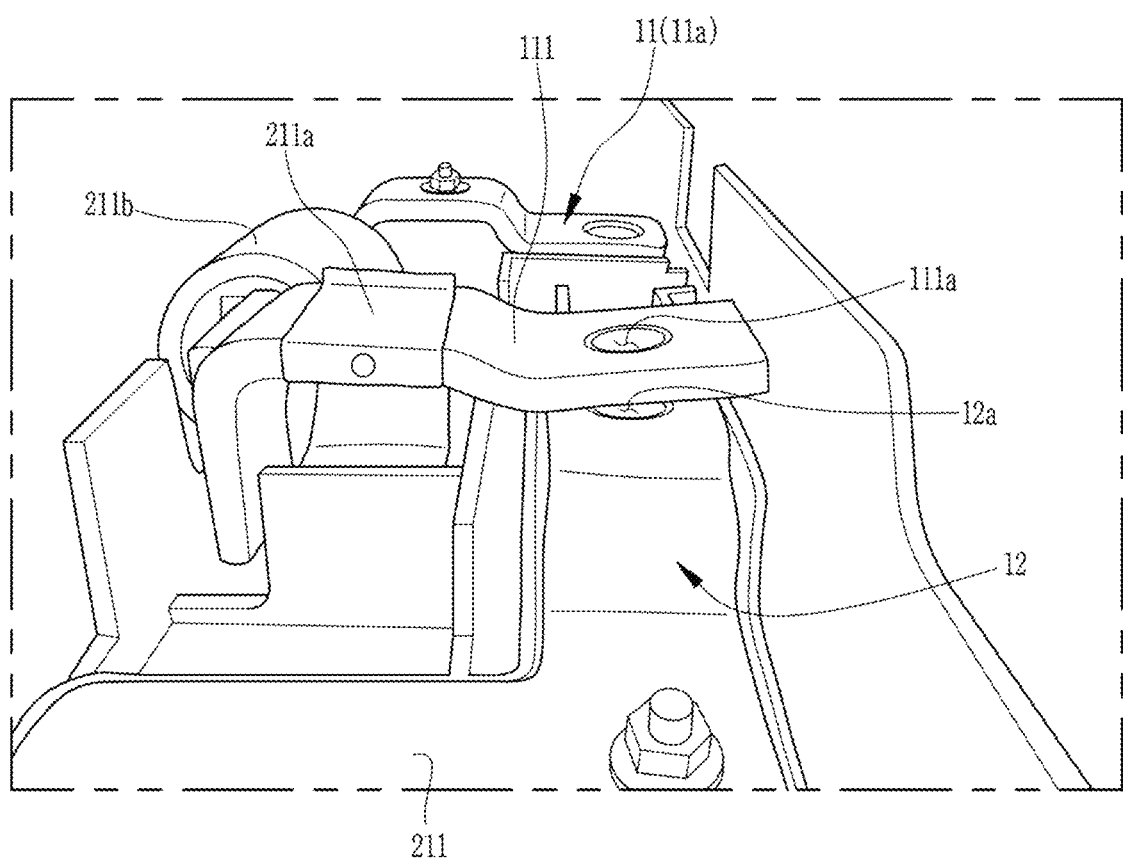
FIG. 3 is a side view schematically illustrating a front plate of the battery module according to an embodiment of the present invention.

Referring to FIGS. 1 to 3, a battery module 1 according to an embodiment of the present invention is configured to package one or more battery sub-modules 10, and includes a protective cover 20 that protects a plurality of stacked battery sub-modules 10 and a BMS module 30 that controls the battery sub-modules 10.

As well known to those skilled in the art, the BMS module 30 is connected to circuitry via a wire harness 50. Information such as voltage or temperature of a sensed battery cell may be transmitted through the wire harness 50 to the BMS module 30. In this regard, the wire harness 50 may be formed of a cable or a flexible printed circuit board.

Of course, the battery module 1 may further include circuitry (not shown) that is connected to the plurality of battery sub-modules 10 to measure and check the voltage and temperature of the battery sub-modules 10.

As shown in the drawings, the protective cover 20 may include a front cover part 210 and a rear cover part 220 located at both ends in a direction where the plurality of battery sub-modules 10 are stacked. Furthermore, the battery module 1 includes side cover parts 230 disposed in the stacking direction on both sides of the plurality of battery sub-modules that are stacked, and disposed on an electrode tab of the battery cell installed in the battery sub-module to protect it from an outside. Preferably, according to the present invention, the front cover part 210 of the protective cover 20 may be disposed on a stacking surface (or outermost stacking surface) formed by stacking the plurality of battery sub-modules.

Optionally, the circuitry may be located on both sides of the plurality of battery sub-modules in the stacking direction to be covered with the side cover parts 230.

A contact terminal 11 may be disposed on the front of the protective cover 20 to electrically connect the plurality of battery modules 1 by means of the conductive connection member 40. Two contact terminals 11 (11a, 11b) are disposed on the front of the battery module 10 to help to connect the battery modules 1 arranged to be adjacent to each other in series, thus making it easy to install and manage the battery rack.

In other words, the two contact terminals 11 may be distributed in the front plate of the battery module 10. Alternatively, the two contact terminals 11 may be distributed on both ends of the battery module, i.e. the front cover part 210 and the rear cover part 220, respectively.

To be more specific, the front cover part 210 includes a front plate 211 that is located at an end of the battery sub-module to support the stacked battery sub-modules 10, and a front cover 212 that is disposed on the front plate 211 to be coupled thereto. A closure cover 213 may be further disposed on the front cover 212.

The front plate 211 is provided with a bus bar 12 that electrically connects the battery sub-modules 10, and a contact terminal 11 that is connected to the bus bar 12 to be electrically connected to the outside. The above-described BMS module 30 may be disposed on the front plate. The bus bar is a component that is electrically connected to provide the current of the battery cells to an external component instead of an electric wire, and is located on a side through which an electrode tab of the battery sub-module is withdrawn, to electrically connect the plurality of battery cells through the electrode tab and thereby extend in length to the front plate.

The battery sub-module 10 includes one or more battery cells 100 that are loaded on a cartridge while being electrically connected by the bus bar, and the cartridge has a predetermined strength to stably support and protect the battery cells.

Each of the battery cells is electrically connected to the outside through the contact terminal 11 (11a, 11b), and the electrode tab of the battery cell may be electrically connected to the contact terminal 11 through an electric line provided on the front plate 211, i.e. the bus bar 12. The contact terminal 11 of the battery module 1 includes a first contact terminal 11a and a second contact terminal 11b of different electrodes. For example, positive terminals of the multiple battery cells 100 that are accommodated while being erected in the stacking direction within the battery module 1 may be connected via one bus bar 12 to the first contact terminal 11a, while negative terminals of the multiple battery cells may be connected through the other bus bar 12 to the second contact terminal 11b. In this regard, the bus bar 12 may be a high-voltage bus bar capable of transmitting a high voltage, e.g. 100V or higher, which may move the electric vehicle.

Preferably, the present invention may include a component that may manually operate the application of a voltage to the contact terminal in the battery module 1 to secure stability when the battery is inspected or managed. A conventional battery module may block and/or allow the current path of an external device by means of a manual service device (MSD) module, and a commercially available MSD module has a drawback that it is an expensive component and is designed in a complex structure.

Thus, the present invention is configured to close or open a current path in a sliding manner and thereby easily control the application of a voltage to the external device.

In other words, the present invention may switch the current path to the open/close state through the simple sliding movement of the switching slider 212c between the bust bar 12 and the contact terminal 11 disposed on the front plate 211.

The present invention is provided with an elastic member 211a, e.g., a plate spring to induce the smooth insertion of the switching slider 212c between the bus bar 12 and a disconnection induction bus bar 111 coupled to the inside end of the contact terminal. As shown in the drawing, the elastic member 211a is disposed between the disconnection induction bus bar 111 and the front plate 211 to forcibly push the disconnection induction bus bar 111 forwards, i.e., towards the front cover 212, and thereby elastically support the disconnection induction bus bar to provide a spacing gap between the contact end of the disconnection induction bus bar 111 and the contact end of the bus bar 12 under the condition that no external force is applied. In the embodiment of the present invention, the switching slider may be formed of an insulating material. In addition, according to the present invention, the front plate 211, the front cover 212, and the closure cover 213 may be formed of an insulating material.

The contact end of the disconnection induction bus bar 111 is spaced apart from the contact end of the bus bar 12 to be superposed thereon. In order to cause the contact end of the disconnection induction bus bar 111 and the contact end of the bus bar 12 to electrically contact each other by means of a bolt B (see FIG. 4B) when the current path is closed, the disconnection induction bus bar has an internal threaded hole 111a in the internal area of the contact end. Correspondingly, the bus bar 12 also has an internal threaded hole 12a in the internal area of the contact end.

Optionally, according to the present invention, a fuse 211b is interposed between the contact terminal 11 and the disconnection induction bus bar 111. As well known to those skilled in the art, the fuse 211b is a member capable of preventing accidents when an internal short-circuit or an overcurrent occurs, and may supplement the power cutoff function of the battery module.

The front cover 212 includes a first window 212a that allows the penetration of the contact terminal 11, a second window 212b that is spaced apart from the first window 212a by a predetermined distance, and a switching slider 212c that is slidably disposed between the first window 212a and the second window 212b. The first window 212a may extend from the upper surface of the front cover to the upper end of the front thereof to check the moving position of the switching slider while guiding the outward extension of the contact terminal. In addition, the second window 212b is formed at a position corresponding to the overlapping portion between the disconnection induction bus bar 111 and the bus bar 12. That is, the internal threaded hole 111a of the disconnection induction bus bar 111 and the internal threaded hole 12a of the bus bar 12, which overlap each other, are arranged on the same line.

Optionally, the present invention may further include a closure cover 213 that closes the front cover 212. The closure cover 213 may form a first through hole 213a that is formed at a position corresponding to the first window 212a and a second through hole 213b that is formed at a position corresponding to the second window 212b to manually displace the position of the switching slider 212c and check the position of the switching slider with the naked eye. The closure cover 213 may include a stopper 213c that opens or closes the second through hole 213b.

In addition, according to the present invention, a spacing gap between the disconnection induction bus bar 111 and the bus bar 12 may be adjusted by a bolt.

As described above, the present invention is configured to open or close the current path, in detail, the current path between the contact terminal 11 and the bus bar 12 through the sliding movement of the switching slider, thus controlling the application of a voltage. The process of determining whether to apply the voltage through the simple manipulation of the switching slider of the battery module according to an embodiment of the present invention will be described below in detail.

Throughout the specification of the present invention, the switching slider 212c of the battery module is designed to open/close the current path between the first contact terminal 11a and the bus bar 12. However, without being limited thereto, the switching slider 212c may be slidably disposed between the second contact terminal 11b and the bus bar 12.

Figure 4A:
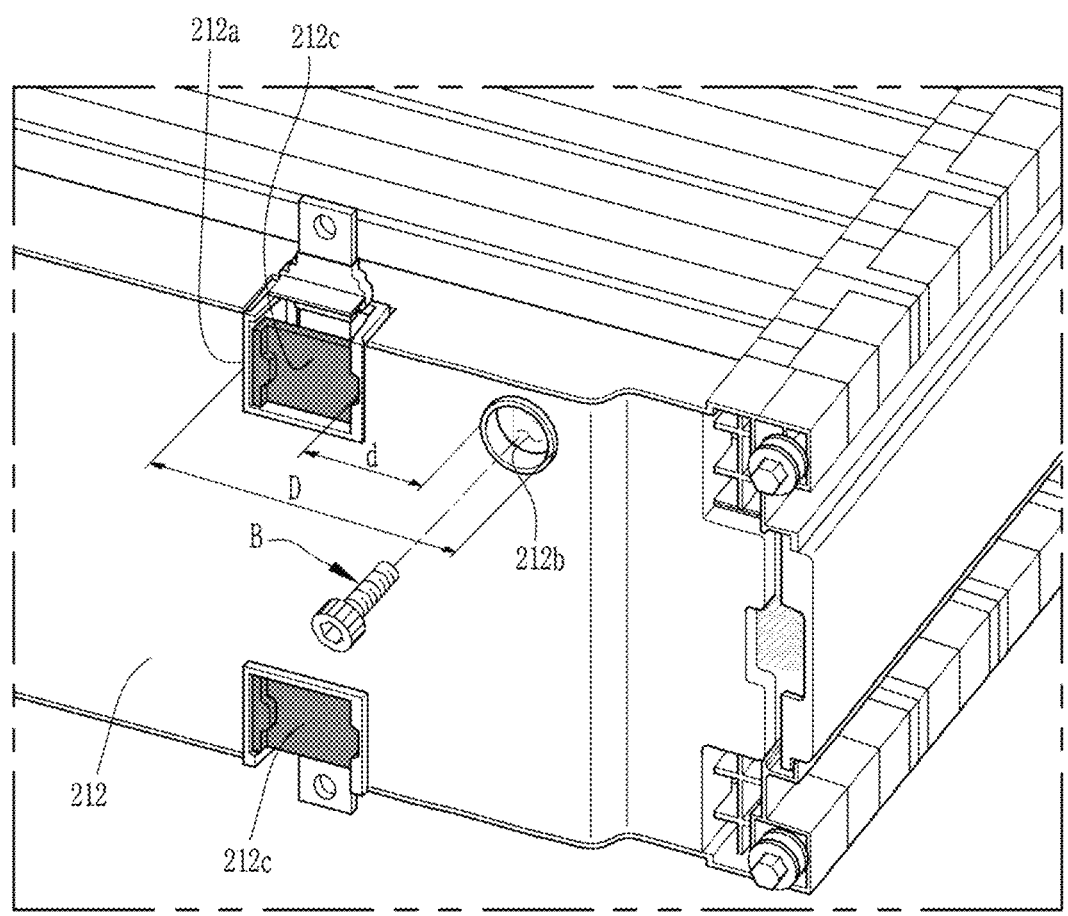
FIG. 4A is a diagram illustrating the battery module that closes a current path when seen from the front.
Figure 4B:
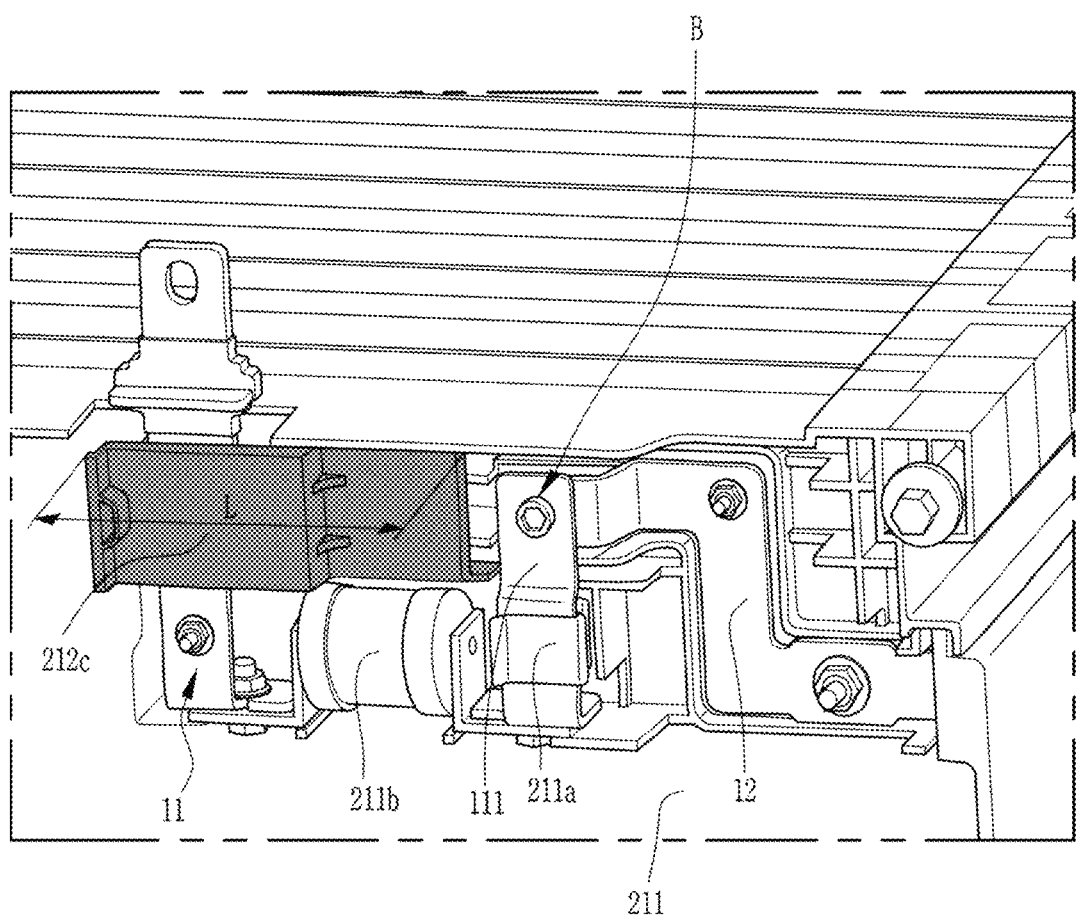
FIG. 4B is a diagram illustrating the arrangement of the front plate and a switching slider of the battery module that closes the current path.
Figure 4C:
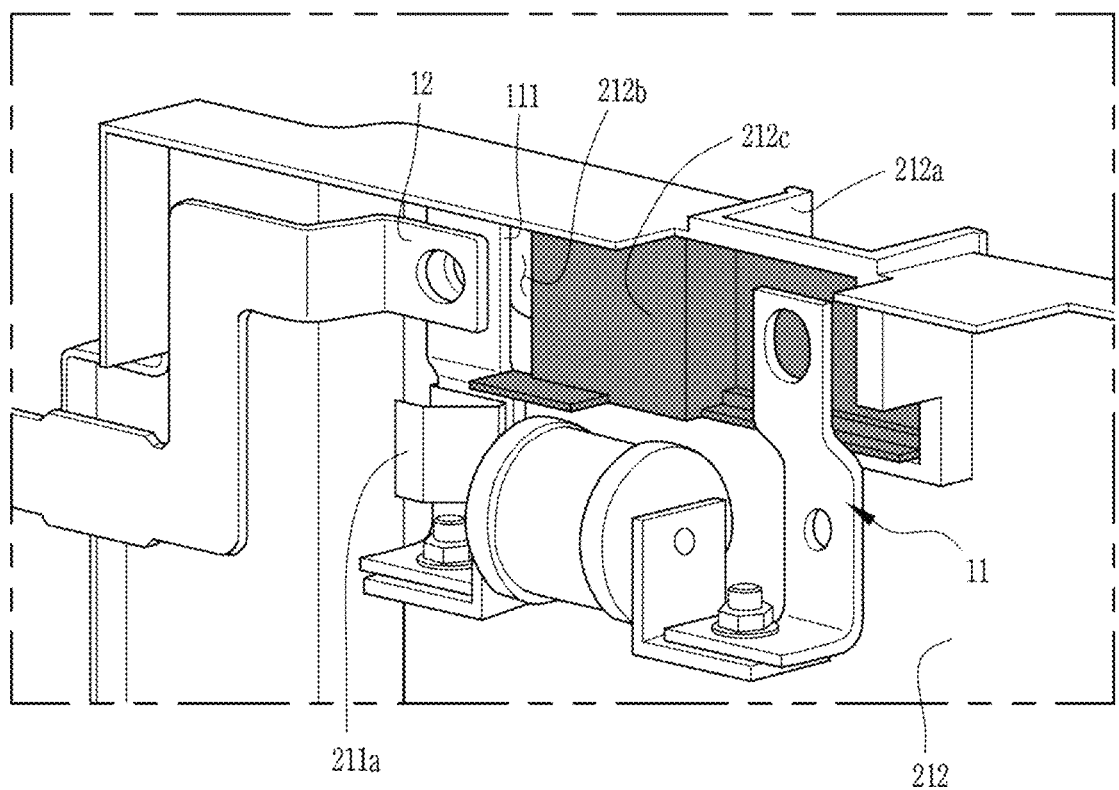
FIG. 4C is a diagram illustrating a front cover of the battery module that closes the current path when seen from the rear.

In order to close the current path, according to the present invention, as shown in FIGS. 4A to 4C, the switching slider 212c of the insulating material is manually moved forwards, so the first window 212a is converted to a closed state with one end of the switching slider. Thereafter, a worker fastens the internal threaded hole 111a of the disconnection induction bus bar 111 and the internal threaded hole 12a of the bus bar 12 via a bolt after passing through the second through hole of the closure cover and the second window 212b of the front cover, to cause the contact end of the disconnection induction bus bar and the contact end of the bus bar 12 to contact each other and be electrically connected to each other, thus applying a voltage to an outside.

The switching slider 212c extends to a length ranging from a maximum spacing distance D between the first window 212a and the second window 212b to a minimum spacing distance d between the first window and the second window, so the other end of the switching slider is pulled out between the contact end of the disconnection induction bus bar and the contact end of the bus bar when the switching slider moves forwards, thus helping to fasten the overlapping portions to each other by a bolt B.

A worker may easily check the closed state of the first window with one end of the switching slider 212c with the naked eyes, and may recognize the closed state of the current path by fastening the bolt through the second window.

According to the present invention, the contact end of the disconnection induction bus bar and the contact end of the bus bar are fastened by the bolt when the voltage is applied, thus preventing the unexpected retraction of the switching slider and thereby stably keeping the current path closed.

Figure 5A:
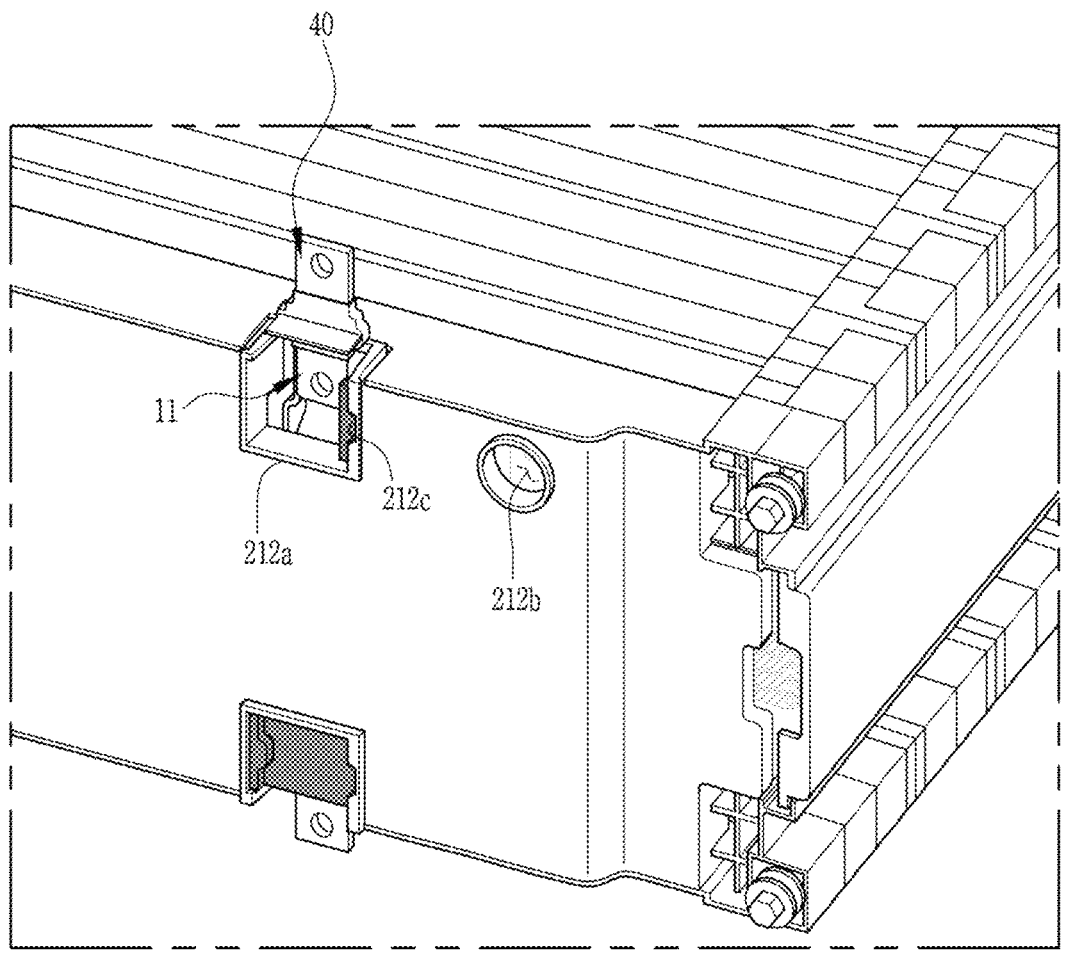
FIG. 5A is a diagram illustrating the battery module that opens the current path when seen from the front.
Figure 5B:
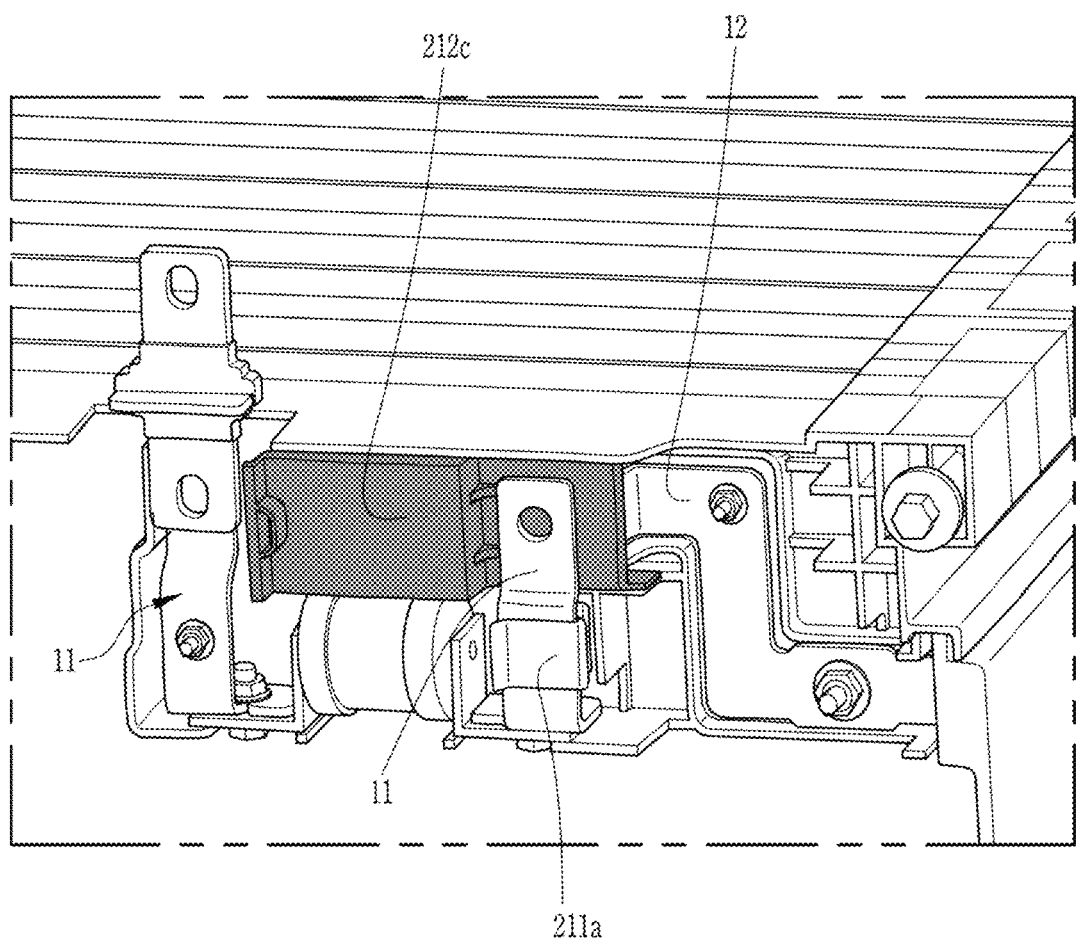
FIG. 5B is a diagram illustrating the arrangement of the front plate and the switching slider of the battery module that opens the current path.
Figure 5C:
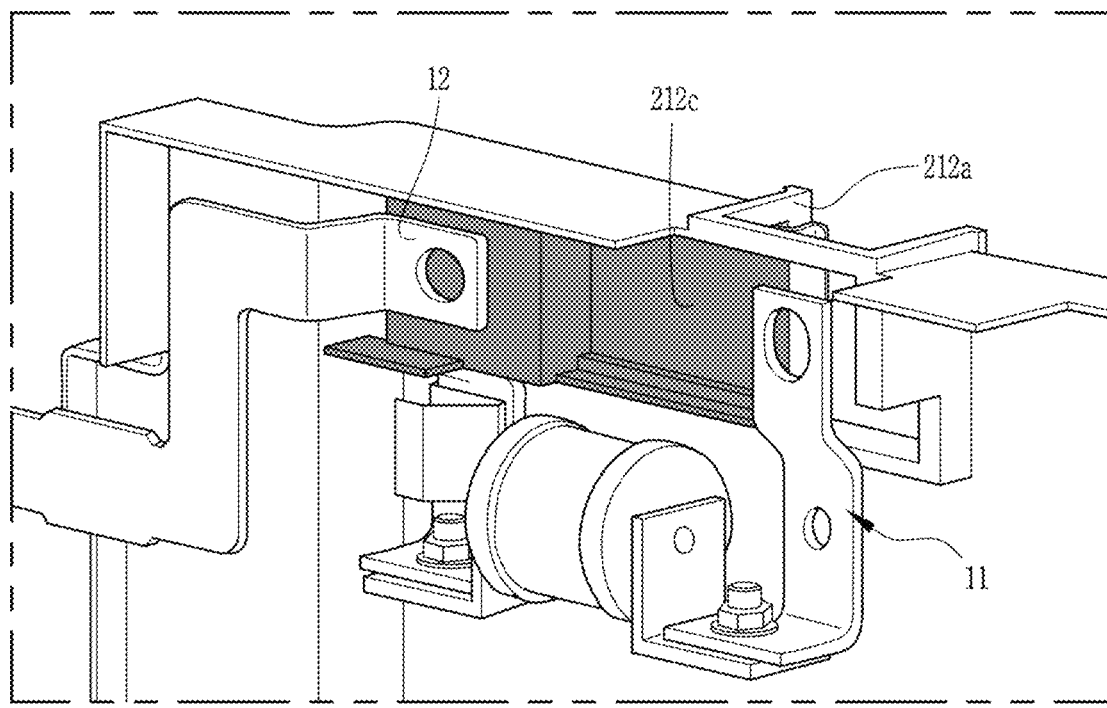
FIG. 5C is a diagram illustrating the front cover of the battery module that opens the current path when seen from the rear.

On the contrary, as shown in FIGS. 5A to 5C, according to the present invention, the switching slider 212c may be manually retracted to open the current path.

A worker loosens the bolt fastened to the disconnection induction bus bar and the bus bar prior to the retraction of the switching slider, thus forcibly pushing the disconnection induction bus bar towards the front with the resilient force of the elastic member 211a and thereby providing a spacing gap between the contact end of the disconnection induction bus bar and the contact end of the bus bar. Thereafter, a worker moves the switching slider 212c backwards to switch the first window 212a to the open state and guides the other end of the switching slider to be located between the contact end of the disconnection induction bus bar 111 and the contact end of the bus bar 12, thus releasing electric connection and preventing a voltage from being applied to the outside.

According to the present invention, the open state of the first window can be easily checked with the naked eyes, and the arrangement of the switching slider between the disconnection induction bus bar and the bus bar can be checked through the second window, thus allowing the open state of the current path to be recognized.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A battery module, comprising:
a plurality of battery sub-modules; and
a front cover part configured to cover an outermost stacking surface of the plurality of stacked battery sub-modules,
wherein the front cover part comprises:
a front plate including a contact terminal electrically connected to an outside, a bus bar electrically connecting the plurality of battery sub-modules to each other, and a disconnection induction bus bar coupled to the contact terminal and spaced apart from the bus bar, and configured to be pressed to be in contact with the bus bar; and
a switching slider configured to slided between the bus bar and the disconnection induction bus bar to open or close a current path between the bus bar and the disconnection induction bus bar.

2. The battery module of claim 1, wherein the disconnection induction bus bar is elastically supported on the front plate by an elastic member.

3. The battery module of claim 1, wherein a contact end of the disconnection induction bus bar forms an internal threaded hole in an internal area, and
a contact end of the bus bar forms an internal threaded hole on a same line as the internal threaded hole of the disconnection induction bus bar.

4. The battery module of claim 1, wherein the disconnection induction bus bar and the bus bar are fastened by a bolt to be pressed and contacted.

5. The battery module of claim 1, wherein the front plate further arranges a fuse between the contact terminal and the disconnection induction bus bar.

6. The battery module of claim 1, wherein the switching slider is slidably disposed on the front cover coupled to the front plate.

7. The battery module of claim 6, wherein the front cover comprises:
a first window allowing penetration of the contact terminal; and
a second window spaced apart from the first window by a predetermined distance,
wherein the switching slider is slidably disposed between the first window and the second window.

8. The battery module of claim 7, wherein the second window is formed at a position corresponding to an overlapping portion between the disconnection induction bus bar and the bus bar.

9. The battery module of claim 7, wherein the switching slider has a length within a range from a maximum spacing distance between the first window and the second window to a minimum spacing distance between the first window and the second window.

* * * * *